United States Patent [19]
Grube et al.

[11] Patent Number: 5,502,831
[45] Date of Patent: Mar. 26, 1996

[54] METHOD FOR DETECTING UNAUTHORIZED MODIFICATION OF A COMMUNICATION OR BROADCAST UNIT

[75] Inventors: Gary W. Grube, Palatine; Timothy W. Markison, Hoffman Estates, both of Ill.

[73] Assignee: Motorola, Inc., Schaumburg, Ill.

[21] Appl. No.: 106,029

[22] Filed: Aug. 13, 1993

Related U.S. Application Data

[63] Continuation of Ser. No. 23,298, Feb. 26, 1993.

[51] Int. Cl.$^6$ ................................................. G06F 12/14
[52] U.S. Cl. .................... 395/427; 364/284; 364/266.4; 364/267.8; 364/266.6; 364/DIG. 1
[58] Field of Search ................................ 395/800, 425; 380/25

[56] References Cited

U.S. PATENT DOCUMENTS

| | | | |
|---|---|---|---|
| 3,931,504 | 1/1976 | Jacoby | 395/575 |
| 5,048,085 | 9/1991 | Abraham | 380/23 |
| 5,086,506 | 2/1992 | Hall | 455/8 |
| 5,212,724 | 5/1993 | Mazarenko | 379/58 |

*Primary Examiner*—Eric Coleman
*Attorney, Agent, or Firm*—Timothy W. Markison

[57] ABSTRACT

A database unit monitors the communications occurring within at least one communication system for hardware identification codes of communication or broadcast units. Upon detecting the hardware identification code, the database unit compares the one received with a stored hardware identification code for the unit. When the stored hardware code does not match the one received, the database unit indicates that the unit has undergone an unauthorized modification.

8 Claims, 2 Drawing Sheets

METHOD FOR DETECTING UNAUTHORIZED MODIFICATION OF A COMMUNICATION OR BROADCAST UNIT

This is a continuation of co-pending patent application having a serial number of 08/023,298, filed on Feb. 26 1993, and entitled "Detection of Unauthorized Use of Software Applications in Processing Devices".

FIELD OF THE INVENTION

The present invention relates generally to communication systems and, in particular, to the detection of unauthorized modifications to communication units.

BACKGROUND OF THE INVENTION

Land mobile radio communication systems and cellular radio/telephone communication systems (radio frequency (RF) communication systems) are known to include a plurality of communication units, a limited number of communication resources, broadcast units, and a resource controller. Communication units, which may be portable, mobile, or cellular radio/telephones, communicate voice or data information to other communication units or landline communication units via a communication resource and a broadcast unit. For a communication unit to be allocated a communication resource, the unit sends a request to the resource controller, wherein the request indicates that a communication resource is desired and what it is desired for. For example, if a communication unit in a trunked communication system desires to place a talk group call, the request will contain the indicating that the communication resource is needed for a talk group call. Upon receiving the request, the resource controller processes it by determining whether the communication unit is a registered user of the system and whether the communication unit can request a talk group call. When the resource controller answers both of these questions in the positive, a communication resource is allocated to the communication unit for the talk group call.

The unit may request many other features that a communication system offers. For example, the communication unit may request interconnection calls (i.e. a telephone call through a public telephone switching network), private calls within the communication system, data transmissions, such as a facsimile transmission, secure transmissions, and many other special services. Each of these features are offered to subscribers (users of a communication unit) of a communication system for a fee. As would be expected to provide all, or even a few, of these features, a communication unit is a complexed piece of equipment composed of several operational platforms, modules, and/or printed circuit boards.

In an effort to save research and development (R & D) funds, a less scrupulous manufacturer might be inclined to take the operational platforms, or the circuitries contained thereon, from reputable manufacturers and use them in their own products. In addition, the less scrupulous manufacturer may offer services, without the authorization of a reputable manufacturer, to subscribers that upgrade a communication unit having a limited set of special features to a communication unit that offers substantially all of the special features available. In either case, the less scrupulous manufacturer can offer identical products, or upgrade services, at a lower price than the reputable manufacturers because it didn't have the R & D expenses. Thus, taking market share away from the reputable manufacturers.

In addition to taking market share away for communication units, the less scrupulous manufacturer may also take operational platforms, or the circuitries contained thereon, of a broadcast unit of the reputable manufacturer. With the operational platforms, or the circuitries, of broadcast units, the less scrupulous manufacturer can offer an entire communication system at a reduced price. Thus, take further market share away from the reputable manufacturer. In order to minimize the market share loss, many reputable manufacturers protect their products, including and/or broadcast units, by obtaining patent and copyright protection.

While patent and copyright protection offer a substantial amount of protection, detecting infringement of these rights is difficult. Many manufacturers discover that one of their patented or copyrighted products has been infringed through advertisements of competitors, from customers, or from their sales force. Each of these methods are limited in that the manufacturer is reliant on informants to discover the infringement. In essence, these methods don't offer an active way of discovering infringement. Therefore, a need exists that allows manufacturers, especially those that manufacture communication and/or broadcast units, to actively detect when their patented and/or copyrighted products have been infringed.

DESCRIPTION OF A PREFERRED EMBODIMENT

Generally, the present invention provides a method for detecting unauthorized modifications of a communication, or broadcast, unit. This is accomplished by having the communication, or broadcast, unit detect whether it has been modified. If the unit has been modified, it generates an assembly code which is transmitted to a database unit, via a receiver, either upon the event or at a predetermined time interval. Upon receiving the assembly code, the database unit accesses a database to retrieve a stored assembly code for the unit and compares them. When the transmitted assembly code does not match the stored assembly code, the database unit identifies the communication unit as one that has undergone an unauthorized modification. With this method, a manufacturer of communication, and/or broadcast, units is provided an active means for detecting when their patented and/or copyrighted products have been modified without authorization.

Figure 1:
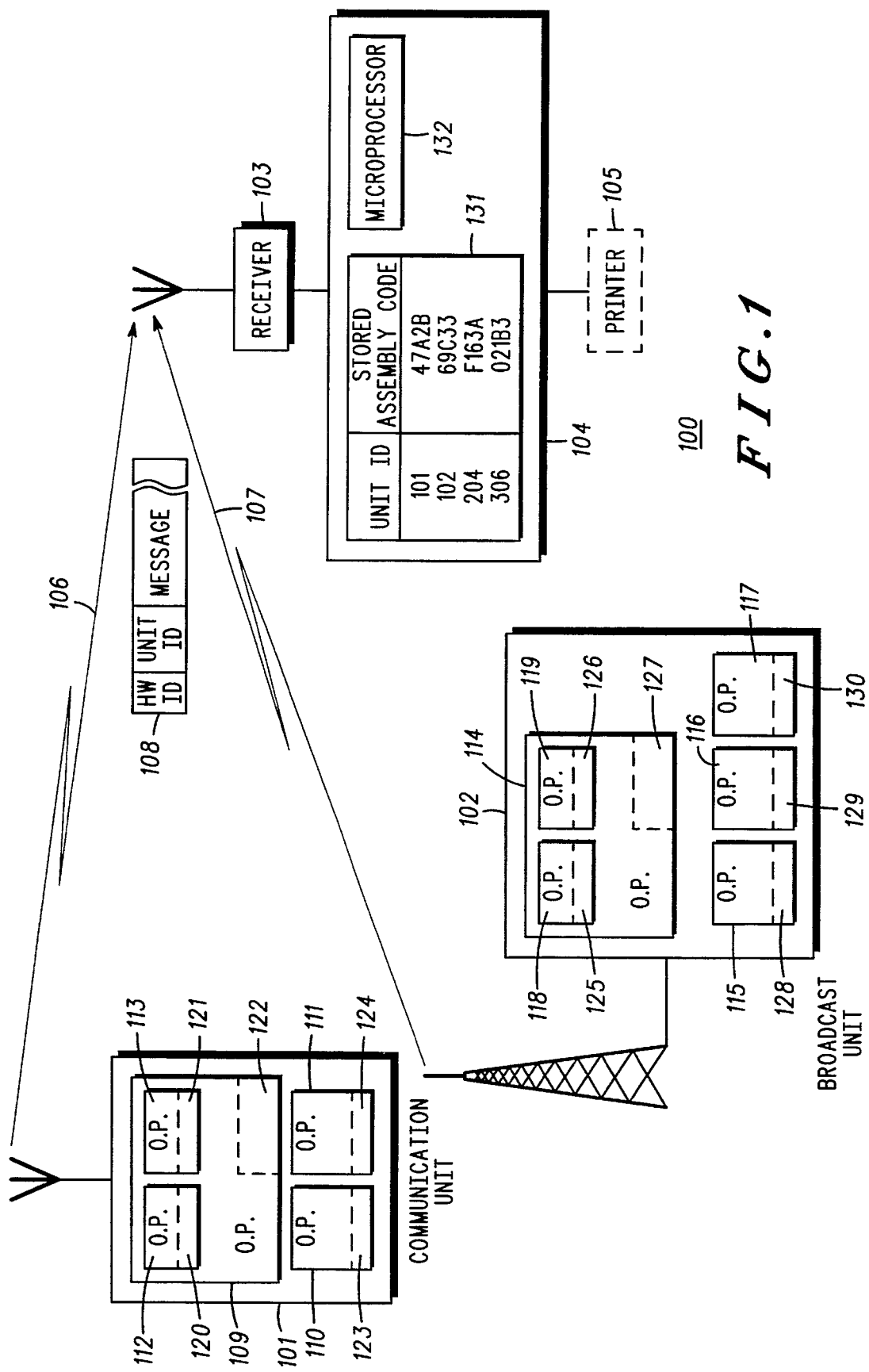
FIG. 1 illustrates a communication system, equipped with a database unit, in accordance with the present invention.
Figure 2:
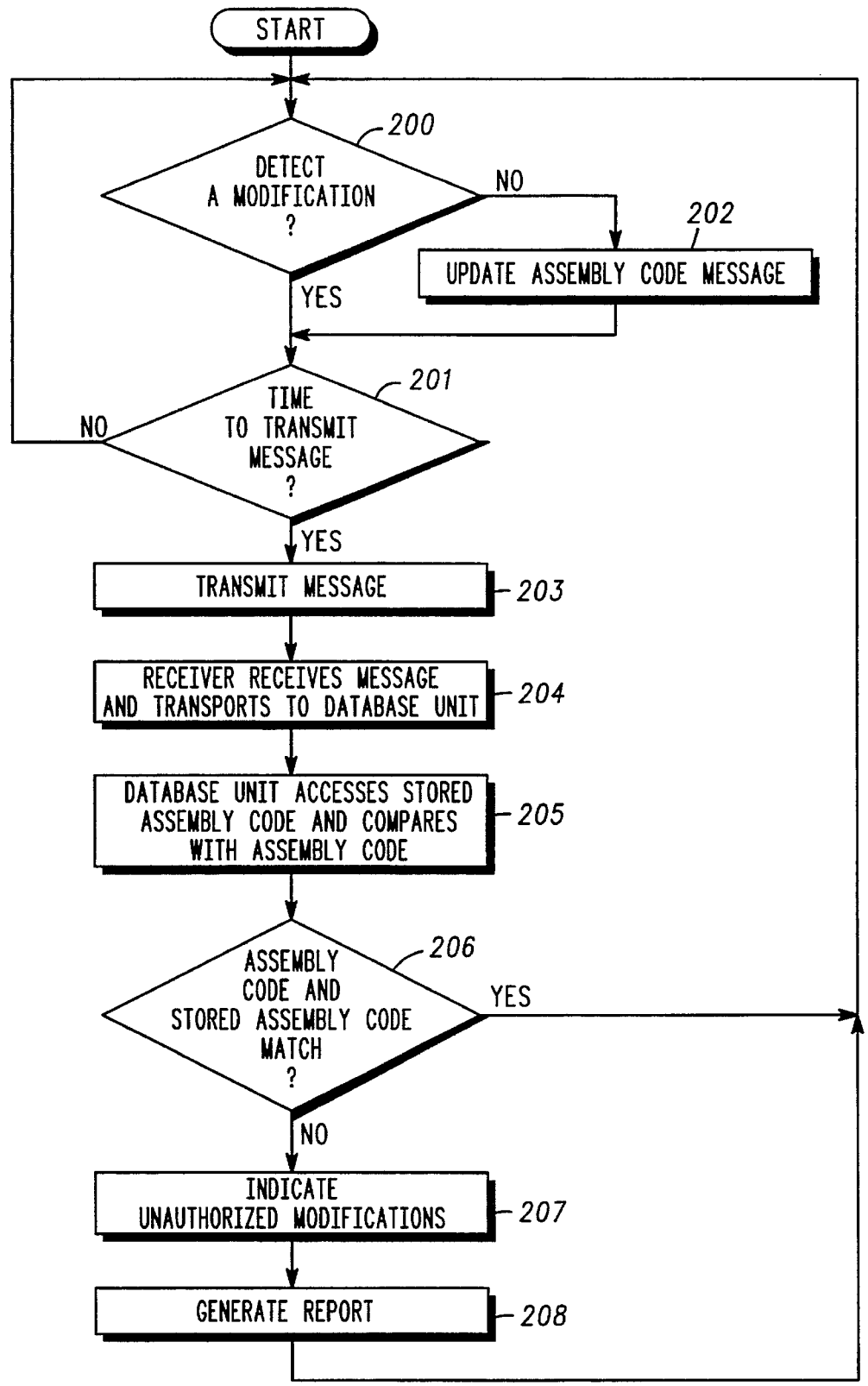
FIG. 2 illustrates a logic diagram that may be used to implement the present invention to detect the unauthorized modification of a communication unit.

The present invention can be more fully described with reference to FIGS. 1–2. FIG. 1 illustrates communication system 100 that includes a plurality of communication units 101 (only one shown), a plurality of broadcast units 102 (only one shown), a radio frequency (RF) receiver 103, a database unit 104, a printer 105, and a limited number of radio frequency (RF) communication resources 106–107. The communication unit 101, which may be portable, mobile, or cellular radio/telephone, comprises a plurality of operational platforms 109–113. The operational platforms 109–113 may be printed circuit boards or assembly modules that support the circuitry and software programs that make up a communication unit. For example, the circuitry may be a receiver, a transmitter, a digital signal processor, and an encryption/decryption processor; while the software programs, which are stored in memory (not shown), may be the algorithms needed to perform system features, such as talk group call requests, interconnect calling, a private trunking calling, and data transmissions. The operational platforms further include a unique platform identification code 120–124. The unique platform identification codes, which may be derived from integrated circuits that generate a unique serial number, are used to make up the communication unit's hardware identification code. Similarly, serial numbers of the software programs are used to make up the communication unit's software identification code. The hardware identification code and/or the software code may be used to generate an assembly code for the communication unit which, along with the communication unit identification code, is used to inform the database unit 104 of unauthorized modifications.

The broadcast unit, which may be a repeater and/or base station, 102 comprises a plurality of operational platforms 114–119. Like the communication unit, the operational platforms 114–119 support the circuitry and software that make up a broadcast unit 102. The circuitry that makes up the broadcast unit includes a transmitter, a receiver, a power supply, and an encryption detector that allows either encrypted or unencrypted data to be transceived by the broadcast unit; while the software, which is stored in memory (not shown), comprises the algorithms that allow the broadcast unit to facilitate the services provided by the system. For example, the algorithms may be for interconnect calls, group calls, etc. The operational platforms 114–119 further include a unique platform identification code. The unique platform identification code, which may be generated by an integrated circuit that provides unique serial numbers, is used to derive the hardware identification code for the broadcast unit. Similarly, serial numbers of the software programs are used to make up the communication unit's software identification code. How the unique platform identification codes are used to generate the hardware identification code and how the assembly code is generated for the broadcast unit and/or the communication unit will be discussed below.

The database unit 104 receives information from the receiver 103, wherein the receiver 103 may be a communication unit that is coupled to the database unit 104. The database unit 104, which may be a personal computer that has the capabilities to store large amounts of data (in excess of 100 Mbytes), includes memory 131 and a processing device 132. The memory 131 is arranged into a database that has a unit identification code field and a stored assembly code field. Each of these fields are controlled by the manufacturer of the communication unit or the broadcast unit to provide accurate information as to when an unauthorized modification has occurred. As is shown, the unit identification code may be a hexadecimal number, or any number system, that is assigned by the manufacturer and is unique to the communication unit or broadcast unit. Likewise, the assembly code may be a hexadecimal number.

Having defined the elements of the communication system 100, the basic operation of the system, incorporating the present invention, may be described with reference to FIG. 2. Note that throughout the discussion regarding FIG. 2, a unit refers to either a communication unit or a broadcast unit. At step 200, the unit determines whether a modification has occurred. A modification may be detected by a tamper detection circuit which detects whether an attempt was made to open the unit, or a modification may be detected when software is changed within the unit. To the unit, any modification detected will be reported to the database unit (discussed below), but the modification is only unauthorized if the manufacturer wasn't aware of the modification. Thus, normal service repairs will not cause a problem because the database unit can be updated to indicate the upcoming change.

If a change has occurred 200, the unit updates an assembly code 202. The assembly code is generated by using the hardware identification code and/or the software identification code. To generate the hardware and/or software identification codes, the unit accesses the operational platforms, or modules to retrieve the operational platform (module) module codes and the serial numbers of the software programs. After accessing the module identification codes and the serial numbers, the unit generates the assembly code based on a first predetermined function. The first predetermined function may be any type of mathematical operand. For example, the first predetermined function may be a summer that sums the individual module identification codes to produce the hardware identification codes, sums the serial numbers to obtain the software identification code, and sums the software and hardware identification codes to produce the assembly code. Alternatively, the first predetermined function may be a shift register that takes a portion of each module identification code and serial number, combines the portions, and shifts the result. Another alternative uses either the software identification code or the hardware identification code as the assembly code. Regardless of the function, the database unit must know the function, or at least the expected resultant, to provided the matching process, described below.

If a change is not detected 200, or after the assembly code has been updated 202, the unit determines whether it is time to transmit the assembly code message to the database unit 201. The unit may transmit the assembly code message to the database unit in one of two ways. The first method has the unit transmit the message after detection of the modification. Note that the unit may not immediately transmit the message after detection because the communication unit may not be operable or active within the communication system. The second method transmits the assembly code message after a predetermined time interval has elapsed, wherein the predetermined period of time may be one day to one month. For either method, the assembly code message includes the assembly code and the identification code of the unit.

When it is time to transmit the assembly code message 201, the message is transmitted 203. The transmission of the message will be over an RF channel such that it is readily receivable by the receiver. Upon receiving the message, the receiver transports the message to the database unit 204. The transportation of the message will depend on the type of interconnection between the receiver and the database unit. For example, if the connection is an RF connection, the transportation will be over an RF channel. Note that there may be a plurality of receivers providing messages to the database unit, where the plurality of receivers are positioned throughout several communication systems.

Once the database unit has the assembly code message, which contains the unit's identification code and the assembly code 204, the database unit accesses a database to retrieve a stored assembly code for the unit and compares the stored assembly code with the received assembly code 205. If the codes substantially match 206, the process repeats at step 200. For the purposes of this discussion, substantially matches refers to acceptable error rates that result from RF transmissions and any correction techniques used to compensate for the errors. If, however, the codes don't match 206, the database unit indicates that an unauthorized modification has occurred 207. (Recall that if the modification was authorized, the database unit would have been updated with that information.) Having identified that the unit has undergone an authorized modification 207, a report is generated 208. The report may be generated by a printer or similar device. Once the report is generated, the process repeats at step 200.

The above described method may further include a second predetermined period of time which is triggered at the expiration of the first predetermined period of time. The second predetermined period of time provides a window of time during which the database unit expects to receive the assembly code message from the unit. If the database unit did not receive the assembly code message during the second predetermined period of time, the database unit may determine that the unit is inactive or it has been modified. The database unit can determined whether the unit is inactive or been modified by monitoring RF channels for the unit's identification code during the first predetermined period of time. If the unit's identification is detected, which indicates that the unit is being used, and the assembly code is not received during the second predetermined period of time, it's a reasonable assumption that the unit has been modified to remove the assembly code generating circuitry and has therefore undergone an unauthorized modification. If, on the other hand, the unit's identification code was not detected during the first predetermined period of time, it's a reasonable assumption that the unit is inactive and thus may not have undergone an unauthorized modification.

It is understood that the procedures described above can be modified to perform the monitoring on an even more active basis. That is, rather than the database unit only monitoring communications as they occur, it can also transmit requests for information to the communication and broadcast units. When the requested information is provided to the database unit, the process of detecting unauthorized modification continues as described above.

The present invention provides a method for detecting when a communication or broadcast unit has undergone an unauthorized modification. With such a method, a database unit can determine, in an active manner, when a unit has been modified. This is accomplished by comparing a changed status message transmitted by the unit with one that is stored in the database unit. If the changed status messages don't match, the database unit indicates that the unit has undergone an unauthorized modification. Thus, the manufacturers of communication units and broadcast units can actively determine when their products have been modified, or infringed, as opposed to the passive informant means of prior art detection methods.

In another embodiment, the unit's housing also has an identification code that is combined with the identification codes from the operating platforms to form a hardware identification code. Upon a transmission by the unit, the hardware identification code is generated. When the unit transmits a message 203, or an inbound signaling word (ISW), to the desired target receiver, wherein the ISW contains the hardware identification code, the unique identification code of the unit, and a message. The target receiver may be a broadcast unit if the unit transmitting the message is a communication unit or a communication unit if the unit that is transmitting the message is a broadcast unit. The receiver associated with the database unit receives the message and transports the message to the database unit 204. Note that the receiver associated with the database unit is not necessarily the target receiver and, in practice, the receiver will rarely be the target receiver. Also note that there may be a plurality of receivers in a plurality of different communication units coupled to the database unit to monitor the communication units and broadcast units in those systems. In multiple communication systems, the receiver would transport the message to the database unit as described above and the receiver would also transmit an identification code of the communication system.

Having received the message from the receiver, the database unit access the memory to retrieve the stored hardware identification code for the unit 205. The memory is accessed by using the unit's unique identification code as an indexing term. Once retrieved, the stored hardware identification code is compared with the hardware code contained in the message 206. If the stored hardware identification code substantially matches the hardware identification code contained in the message 207, the process ends for this transmission, but repeats at step 200 for any subsequent transmissions by the unit.

If the stored hardware identification code does not substantially match the hardware identification code contained in the message 206, the database unit indicates that the unit has undergone an unauthorized modification 207. For the purposes of this discussion, substantially matches refers to acceptable error rates that result from RF transmissions and any correction techniques used to compensate for the errors. The indication that the database unit generates may be setting a flag such that an operator of the database unit is notified of the unauthorized modification. Alternatively, a report may be generated 208 to indicate the unauthorized modification. Once the indication has been reported, the process ends for this transmission, but repeats at step 200 for subsequent transmissions from the unit.

As a working example of the above described process, assume that a communication unit includes five operational platforms, each with a unique identification code. In addition to the operational platforms having an identification code, the communication unit's housing has a unique identification code. When the communication unit desires to transit a message, a hardware identification code is generated from the operational platform identification codes. Assume that the function used to generate the hardware code, sums the unique identification codes and truncates the least significant bits such that the hardware code is a fixed size (4 bits to 128 bit, for example). Once the hardware code is generated, it, along with the identification code of the communication unit and a message, are transmitted to a target receiver. Assume that the message contains a request for allocation of a communication resource, thus, the target receiver is the resource controller. Because the message is transmitted over an RF medium, the database unit receiver receives the message and transports it to the database unit. The means in which the receiver transports the message to the database unit depends on how the two devices are connected together, which may be any wireline, or wireless, type connections.

Having the message, the database unit compares the stored hardware identification code for the communication with the one contained in the message. When the identification codes don't match, the database unit indicates that the communication unit has undergone an unauthorized modification. For the purposes of this discussion, an unauthorized modification is one that the manufacturer is not aware of, or has not authorized, and results in one or more of the operational platforms of the communication unit being changed. Thus, if an operational platform from one communication unit is placed into another communication unit, both communication units have been modified.

It is understood that the procedures described above can be modified to perform the monitoring on an even more active basis. That is, rather than the database unit only monitoring communications as they occur, it can also transmit requests for information to the communication and broadcast units. When the requested information is provided to the database unit, the process of detecting unauthorized modification continues as described above.

The present invention provides a method for detecting when a communication or broadcast unit has undergone an unauthorized modification. With such a method, a database unit can determine, in an active manner, when a unit has been modified. This is accomplished by comparing a hardware identification code transmitted by the unit with one that is stored in the database unit. If the hardware identification codes don't match, the database unit indicates that the unit has undergone an unauthorized modification. Thus, the manufacturers of communication units and broadcast units can actively determine when their products have been modified, or infringed, as opposed to the passive informant means of prior art detection methods.

We claim:

1. In an RF communication system that includes a plurality of communication units, wherein each of the communication units includes at least one module and at least one software program, a method of detecting an unauthorized modification of a communication unit of the plurality of communication units, the method comprises the steps of:

a. detecting, by the communication unit, expiration of a predetermined time period;

b. when the predetermined time period has expired, transmitting, by the communication unit, a message via an RF communication resource, wherein the message includes a unit identification code and an assembly code, the assembly code based on, at least in part, an identification code of the at least one module and an identification code of the at least one software program;

c. receiving, by an RF receiver, the message;

d. transporting the message from the RF receiver to a database unit;

e. accessing, by the database unit, a stored assembly code based on the unit identification code;

f. comparing, by the database unit, the assembly code to the stored assembly code;

g. indicating, by the database unit, that an unauthorized modification of the communication unit has occurred when the assembly code does not substantially match the stored assembly code.

2. In the method of claim 1, step (f) further comprises, generating, by the database unit, a report of the unauthorized modification when the unauthorized modification is indicated.

3. In an RF communication system that includes a plurality of broadcasting units, wherein each of the broadcasting units includes at least one module and at least one software program, a method of detecting an unauthorized modification of a broadcasting unit of the plurality of broadcasting units, the method comprises the steps of:

a. detecting, by the broadcasting unit, expiration of a predetermined time period;

b. when the predetermined time period has expired, transmitting, by the broadcasting unit, a message via an RF communication resource, wherein the message includes a unit identification code and an assembly code, the assembly code based on, at least in part, an identification code of the at least one module and an identification code of the at least one software program;

c. receiving, by an RF receiver, the message;

d. transporting the message from the RF receiver to a database unit;

e. accessing, by the database unit, a stored assembly code based on the unit identification code;

f. comparing, by the database unit, the assembly code to the stored assembly code;

g. indicating, by the database unit, that an unauthorized modification of the broadcasting unit has occurred when the assembly code does not substantially match the stored assembly code.

4. In the method of claim 3, step (f) further comprises, generating, by the database unit, a report of the unauthorized modification when the unauthorized modification is indicated.

5. In an RF communication system that includes a plurality of communication units, wherein each of the communication units includes at least one module and at least one software program, a method of detecting an unauthorized modification of a communication unit of the plurality of communication units, the method comprises the steps of:

a. detecting a modification of the communication unit, whereupon after detection, transmitting, by the communication unit, a message via an RF communication resource, wherein the message includes a unit identification code and an assembly code, the assembly code based on, at least in part, an identification code of the at least one module and an identification code of the at least one software program;

b. receiving, by an RF receiver, the message;

c. transporting the message from the RF receiver to a database unit;

c. accessing, by the database unit, a stored assembly code based on the unit identification code;

e. comparing, by the database unit, the assembly code to the stored assembly code;

f. indicating, by the database unit, that an unauthorized modification of the communication unit has occurred when the assembly code does not substantially match the stored assembly code.

6. In the method of claim 5, step (f) further comprises, generating, by the database unit, a report of the unauthorized modification when the unauthorized modification is indicated.

7. In an RF communication system that includes a plurality of broadcasting units, wherein each of the broadcasting units includes at least one module and at least one software program, a method of detecting an unauthorized modification of a broadcasting unit of the plurality of broadcasting units, the method comprises the steps of:

a. detecting a modification of the broadcasting unit, whereupon after detection, transmitting, by the broadcasting unit, a message via an RF communication resource, wherein the message includes a unit identification code and an assembly code, the assembly code based on, at least in part, an identification code of the at least one module and an identification code of the at least one software program;

b. receiving, by an RF receiver, the message;

c. transporting the message from the RF receiver to a database unit;

d. accessing, by the database unit, a stored assembly code based on the unit identification code;

e. comparing, by the database unit, the assembly code to the stored assembly code;

f. indicating, by the database unit, that an unauthorized modification of the broadcast unit has occurred when the assembly code does not substantially match the stored assembly code.

8. In the method of claim 7, step (f) further comprises, generating, by the database unit, a report of the unauthorized modification when the unauthorized modification is indicated.

* * * * *

UNITED STATES PATENT AND TRADEMARK OFFICE
CERTIFICATE OF CORRECTION

PATENT NO. : 5,502,831
DATED : March 26, 1996
INVENTOR(S) : Gary W. Grube, and Tim W. Markinson It is certified that error appears in the above-indentified patent and that said Letters Patent is hereby corrected as shown below:

Column 8, Line 36, Claim 5 --c.-- Should be --d.--

Signed and Sealed this

Ninth Day of July, 1996

Attest:

BRUCE LEHMAN

*Attesting Officer*     *Commissioner of Patents and Trademarks*